United States Patent
Uchiyama et al.

(10) Patent No.: US 7,110,876 B2
(45) Date of Patent: Sep. 19, 2006

(54) CONTROL DEVICE FOR DIESEL ENGINE

(75) Inventors: Ken Uchiyama, Toyoake (JP); Kouichi Sugiyama, Chiryu (JP)

(73) Assignee: Denso Corporation, Kariya (JP)

( * ) Notice: Subject to any disclaimer, the term of this patent is extended or adjusted under 35 U.S.C. 154(b) by 73 days.

(21) Appl. No.: 11/046,688

(22) Filed: Feb. 1, 2005

(65) Prior Publication Data
US 2005/0178123 A1    Aug. 18, 2005

(30) Foreign Application Priority Data
Feb. 18, 2004 (JP) ............................. 2004-041476

(51) Int. Cl.
*F02M 25/07* (2006.01)
(52) U.S. Cl. .................. 701/108; 123/568.12; 60/605.2
(58) Field of Classification Search ................ 701/108, 701/109; 123/568.11, 568.12, 568.21; 60/605.2, 60/602
See application file for complete search history.

(56) References Cited

U.S. PATENT DOCUMENTS 6,945,236 B1 * 9/2005 Nakai et al. ........... 123/568.12

FOREIGN PATENT DOCUMENTS

| JP | A-2001-003796 | 1/2001 |
| JP | A-2001-140652 | 5/2001 |
| JP | 2001-182575 A * | 7/2001 |
| JP | 2001-193573 A * | 7/2001 |

* cited by examiner

*Primary Examiner*—Hieu T. Vo
(74) *Attorney, Agent, or Firm*—Nixon & Vanderhye P.C.

(57) ABSTRACT

An engine control device for controlling an exhaust gas recirculation operation includes a variable-capacity turbo supercharger, an EGR valve, a supercharging pressure controller, an EGR controller, and an EGR correction amount calculator. The variable-capacity turbo supercharger varies a flow through an exhaust turbine to change a supercharging pressure. The EGR valve adjusts an exhaust reflow amount of gas flowing from an exhaust passage to an air intake passage. The supercharging pressure controller drives the supercharger to control the supercharging pressure. The EGR controller drives the EGR valve to control the exhaust gas recirculation operation. The EGR correction amount calculator calculates an EGR correction amount according to a change in the exhaust gas recirculation operation. The EGR controller performs a feedback control operation on the EGR valve in accordance with a deviation between an EGR control amount corrected by the EGR correction amount and a target EGR control amount.

12 Claims, 6 Drawing Sheets

CONTROL DEVICE FOR DIESEL ENGINE

CROSS REFERENCE TO RELATED APPLICATIONS

This application is based upon and claims the benefit of priority of Japanese Patent Application No. 2004-41476, filed on Feb. 18, 2004, the contents of which are incorporated herein by reference.

FIELD OF THE INVENTION

The present invention relates to a control device for a diesel engine having a variable-capacity turbo supercharger and an EGR (exhaust gas recirculation) system.

BACKGROUND OF THE INVENTION

In some diesel engines having variable-capacity turbo superchargers that adjust an inlet area (nozzle opening degree) of an exhaust turbine via an adjustable nozzle to change a supercharged pressure characteristic, an EGR operation is implemented for directing a part of an exhaust gas to the flow of intake air to reduce $NO_x$ (nitrogen oxides) emissions.

The amount of exhaust gas (exhaust reflow amount) flowing to the intake airflow by operation of the EGR is adjusted by an EGR valve. Specifically, the EGR valve is subjected to a feedback (F/B) control loop in accordance with a deviation between a target fresh air amount set on the basis of operational conditions of the diesel engine (the rotational number of the engine, the injection amount, etc.) and an actual fresh air amount detected by an air flow meter so that the target fresh air amount and the actual fresh air amount closely coincide.

If the nozzle opening degree of the turbo supercharger is changed when the EGR operation is carried out, the exhaust pressure is increased and the pressure difference between the front and rear sides of the EGR valve is increased so that the exhaust reflow amount for the same opening degree of the EGR valve is increased. As a result, the fresh air amount influences the EGR control.

On the other hand, in a diesel engine in which the EGR rate is controlled to be greater than one of a gasoline engine (for example, the EGR rate is increased so that the EGR amount and the fresh air amount are nearly equal to each other), the exhaust reflow amount is greatly varied in accordance with the variation of the EGR rate so that exhaust energy acting on an exhaust turbine greatly influences a supercharged state.

Accordingly, when both the EGR and the turbo supercharger are independently and substantially simultaneously adapted to the optimum F/B gain and subjected to the F/B control operation, a problem occurs in that the control operations interfere with each other and changes occur in the control parameters (fresh air amount and supercharging pressure).

Japanese Patent document JP-A-2001-140652 discloses a well known technique for preventing interference between EGR and turbo supercharger controls. It describes that a prohibiting area for prohibiting the F/B control operation of the turbo supercharger is set in connection with an operating area in which the EGR operation is carried out. The turbo supercharger is switched to open control in the prohibiting area.

Furthermore, Japanese Patent document JP-A-2001-003796 describes that the exhaust pressure is estimated by using a physical model. The operation amount of the EGR valve is determined in anticipation of an effect on the EGR amount by a variation in the exhaust pressure caused by the operation of the turbo supercharger.

In the well-known technique described above in JP-A-2001-140652, the turbo supercharger is switched to the open control in the F/B prohibiting area so that dispersion occurs in the supercharging pressure due to dispersion among turbo supercharger products. Therefore, as shown in FIG. 6, dispersion occurs in the EGR rate so that dispersion of $NO_x$ is intensified. Furthermore, in the F/B prohibiting area of the turbo supercharger, it is impossible to carry out such F/B adaptation such that the operational performance of an actuator for driving an adjustable nozzle is conducted at a maximum level. This lengthens a steady-state deviation attenuating time needed to converge the supercharging pressure to a target value and the steady-state deviation cannot be attenuated. As a result, the response of the supercharging pressure is delayed or the target value of the supercharging pressure cannot be achieved. Accordingly, in the diesel engine, a sufficient amount of air cannot be taken and it is required to restrict the maximum value of the injection amount in order to prevent smoke such that sufficient acceleration performance cannot be achieved.

On the other hand, in the well-known technique described in JP-A-2001-003796, the physical model for estimating the exhaust pressure is complicated and a large load is imposed on the operation processing of a microcomputer such that this technique is costly. Furthermore, since the operation amount of the EGR valve is determined in anticipation of the effect of the exhaust pressure variation on the EGR amount, the control index (fresh air amount) of the EGR is stabilized. However, the supercharging pressure cannot be stabilized because no attention is paid to the effect of the operation result of the EGR valve on the supercharging pressure.

The present invention has been implemented in view of the foregoing problems and has an object to provide a control device for a diesel engine that can avoid mutual interference between an EGR control operation and a supercharging pressure control operation, control an EGR so that the EGR satisfies a target value even when the opening degree of an adjustable nozzle is varied, and also control the supercharging pressure so that the supercharging pressure satisfies a target value even when the opening degree of an EGR valve is varied.

SUMMARY OF THE INVENTION

One aspect of the present invention includes a variable-capacity type turbo supercharger, an EGR valve, a supercharging pressure controller for controlling supercharging pressure, an EGR controller for controlling an EGR (fresh air amount, excess air ratio, exhaust reflow amount, intake $O_2$ concentration, exhaust $O_2$ concentration, EGR rate, etc.); and an EGR correction amount calculator for calculating an effect of a variation in the opening degree of an adjustable nozzle as an EGR correction amount. The EGR controller subjects the EGR valve to a feedback control operation in accordance with the deviation between an EGR control amount corrected by the EGR correction amount and a target EGR control amount.

According to the above construction, the EGR valve can be subjected to the feedback control operation in anticipation of an effect of the opening degree variation of the adjustable nozzle on the EGR. Therefore, even when the opening degree of the adjustable nozzle is varied, the EGR can be controlled as expected. Furthermore, according to the present invention, it is not required to set a feedback prohibiting area in an EGR control area and, thus, the feedback adaptation can be performed so that the operation performance of an actuator for driving the EGR valve can be conducted at a maximum level. Accordingly, the response of the EGR is not delayed and the accumulation of smoke and emission of $NO_x$ can be prevented.

Another aspect of the present invention includes a variable-capacity type turbo supercharger, an EGR valve, a supercharging pressure controller for controlling supercharging pressure, an EGR controller for controlling an EGR (fresh air amount, excess air ratio, exhaust reflow amount, intake $O_2$ concentration, exhaust $O_2$ concentration, EGR rate, etc.), and a supercharging pressure correction amount calculator for calculating an effect of a variation in the opening degree of the EGR valve on the supercharging pressure as a supercharging pressure correction amount. The supercharging pressure controller subjects an adjustable nozzle to a feedback control operation in accordance with the deviation between the supercharging pressure corrected by the supercharging pressure correction amount and the target supercharging pressure.

According to the above construction, the adjustable nozzle can be subjected to the feedback control operation in anticipation of the effect of the variation of the opening degree of the EGR valve on the supercharging pressure. Therefore, even when the opening degree of the EGR valve is varied, the supercharging pressure can be controlled as expected. Furthermore, it is not required to set a feedback prohibiting area in a supercharging pressure control area so that the operation performance of an actuator for driving the adjustable nozzle can be conducted at maximum level. Accordingly, the response of the supercharging pressure is not delayed and engine output (for example, acceleration performance) can be sufficiently achieved.

Another aspect of the present invention includes a variable-capacity type turbo supercharger, an EGR valve, a supercharging pressure controller for controlling supercharging pressure, an EGR controller for controlling an EGR (fresh air amount, excess air ratio, exhaust reflow amount, intake $O_2$ concentration, exhaust $O_2$ concentration, EGR rate, etc.), an EGR correction amount calculator for calculating as an EGR correction amount an effect of variation of the opening degree of an adjustable nozzle on the EGR, and a supercharging pressure correction amount calculator for calculating as a supercharging pressure correction amount an effect of a variation of the opening degree of an EGR valve on the supercharging pressure. The EGR controller subjects the EGR valve to a feedback control operation in accordance with the deviation between an EGR control amount corrected by the EGR correction amount and a target EGR control amount. The supercharging pressure controller subjects an adjustable nozzle to the feedback control operation in accordance with the deviation between a supercharging pressure corrected by the supercharging correction amount and target supercharging pressure.

According to the above construction, the mutual interference between the EGR control operation and the supercharging pressure control operation can be avoided. Also, the EGR and the supercharging pressure can be controlled as expected even when the opening degree of the variable nozzle and EGR valve are varied, respectively. Furthermore, since it is not required to set the feedback prohibiting area for each of the EGR control area and the supercharging pressure control area, feedback adaptation can be performed so as to educe the operation performance of an actuator for driving the EGR valve and an actuator for driving an adjustable nozzle at maximum level.

In another aspect of the present invention, when a relational expression between the deviation input to the EGR controller and the operation amount of the EGR valve is represented by C1, a relational expression between the variation of the opening degree of the adjustable nozzle input to the EGR correction amount calculator and the EGR correction amount calculated is represented by C2, an equation representing the variation amount of EGR occurring due to variation of the opening degree of the EGR valve is represented by P1 and an equation representing the variation amount of EGR occurring due to variation of the opening degree of the adjustable nozzle is represented by P2, $$C2=P2/(C1 \cdot P1) \quad (1)$$

The EGR correction amount calculator is characterized by calculating the EGR correction amount C2 from the above equation (1).

In another aspect of the present invention, when a relational expression between the variation of the opening degree of the EGR valve input to the supercharging pressure correction amount calculator and the supercharging pressure correction amount calculated is represented by C3, a relational expression between the deviation input to the supercharging pressure controller and the operation amount of the adjustable nozzle is represented by C4, an equation representing the variation amount of the supercharging pressure occurring in accordance with the opening degree variation of the EGR valve is represented by P3, and an equation representing the variation amount of the supercharging pressure occurring due to the opening degree variation of the adjustable nozzle is represented by P4, $$C3=P3/(C4 \cdot P4) \quad (2)$$

The supercharging pressure correction amount calculator is characterized by calculating the supercharging pressure correction amount C3 from the equation (2).

In another aspect of the present invention, the EGR correction amount calculator stores the time-variation of EGR occurring in accordance with the opening degree variation of the adjustable nozzle as an approximate expression represented by a vain time and a primary delay, and the variation amount of EGR occurring in accordance with the opening degree variation of the adjustable nozzle is calculated from the approximate expression.

According to an aspect of the present invention shown in FIG. 5A, the time-variation of the EGR control amount (the fresh air amount, the excess air ratio λ, etc.) relative to the opening degree variation of the adjustable nozzle (VNT positional variation Δ) is measured in advance by an actual machine, the time-variation of the EGR control amount thus measured is represented by using an approximate expression represented by "vain time+primary delay(response time constant)," and variation of the EGR control amount which will occur in accordance with variation of the opening degree of the adjustable nozzle in the future can be easily estimated by using information achieved from a driving condition of the diesel engine according to the approximate equation without using any complicated physical model.

According to another aspect of the present invention, the supercharging pressure correction amount calculator stores the time-variation of the supercharging pressure occurring in accordance with the opening degree variation of the EGR valve as an approximate expression represented by a vain time and a primary delay, and calculates the variation amount of the supercharging pressure occurring in accordance with the opening degree variation of the EGR valve according to the approximate expression.

According to an aspect of the present invention shown in FIG. 5B, the time-variation of the supercharging pressure with respect to the opening degree variation (Δ) of the EGR valve is measured in advance by an actual machine, the time-variation of the supercharging pressure thus measured is represented by using an approximate expression using "vain time+primary delay(response time constant)," and the variation of the supercharging voltage which will occur in accordance with the opening degree of the EGR valve in the future can be easily estimated by using information achieved from a driving condition of the diesel engine according to the approximate expression.

According to yet another aspect of the present invention, the EGR controller subjects the opening degree of the EGR valve to feedback control operation in anticipation of an effect of the opening degree variation of the adjustable nozzle on EGR only when it is judged that the driving state of the diesel engine is stationary.

For example, when a vehicle is accelerated, the EGR valve is controlled to be fully closed, and also the adjustable nozzle of the turbo supercharger is controlled to a supercharging side (close side). In this case, when the EGR valve is subjected to the feedback control operation in anticipation of the variation of EGR occurring in accordance with the opening degree variation of the adjustable nozzle, the EGR valve is subjected to F/B control in anticipation of reduction of the fresh air amount occurring due to the valve closing operation of the adjustable nozzle, so that the response of EGR is delayed. Therefore, during the transit period of the diesel engine, the response of EGR would be more excellent when no EGR correction amount calculated in the EGR correction amount calculator is used rather than when the EGR correction amount thus calculated is used. Accordingly, the calculation result of the EGR correction amount calculator is used only when the driving state of the diesel engine is stationary.

According to yet another aspect of the present invention, the supercharging pressure controller subjects the opening degree of the adjustable nozzle to the feedback control operation in anticipation of the effect of the opening degree variation of the EGR valve on the supercharging pressure only when it is judged that the driving state of the diesel engine is stationary.

For example, when a vehicle is accelerated, the EGR valve is controlled to be fully closed, and the adjustable nozzle of the turbo supercharger is controlled to a supercharging side (close side). In this case, when the adjustable nozzle is subjected to the feedback control operation in anticipation of the variation of the supercharging pressure occurring in accordance with the opening degree variation of the EGR valve, the adjustable nozzle is subjected to F/B control in anticipation of increase of the supercharging pressure caused by the valve closing operation of the EGR valve, and thus the response of the supercharging pressure is delayed. Therefore, during the transit period of the diesel engine, the response of the supercharging pressure would be more excellent when the supercharging pressure correction amount calculated by the supercharging pressure correction amount calculator is not used rather than when supercharging pressure correction amount is used. Accordingly, the calculation result of the supercharging pressure correction amount calculator is used only when the driving state of the diesel engine is stationary.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

The best modes for carrying out the invention will be described in detail on the basis of the following embodiments.

Figure 1:
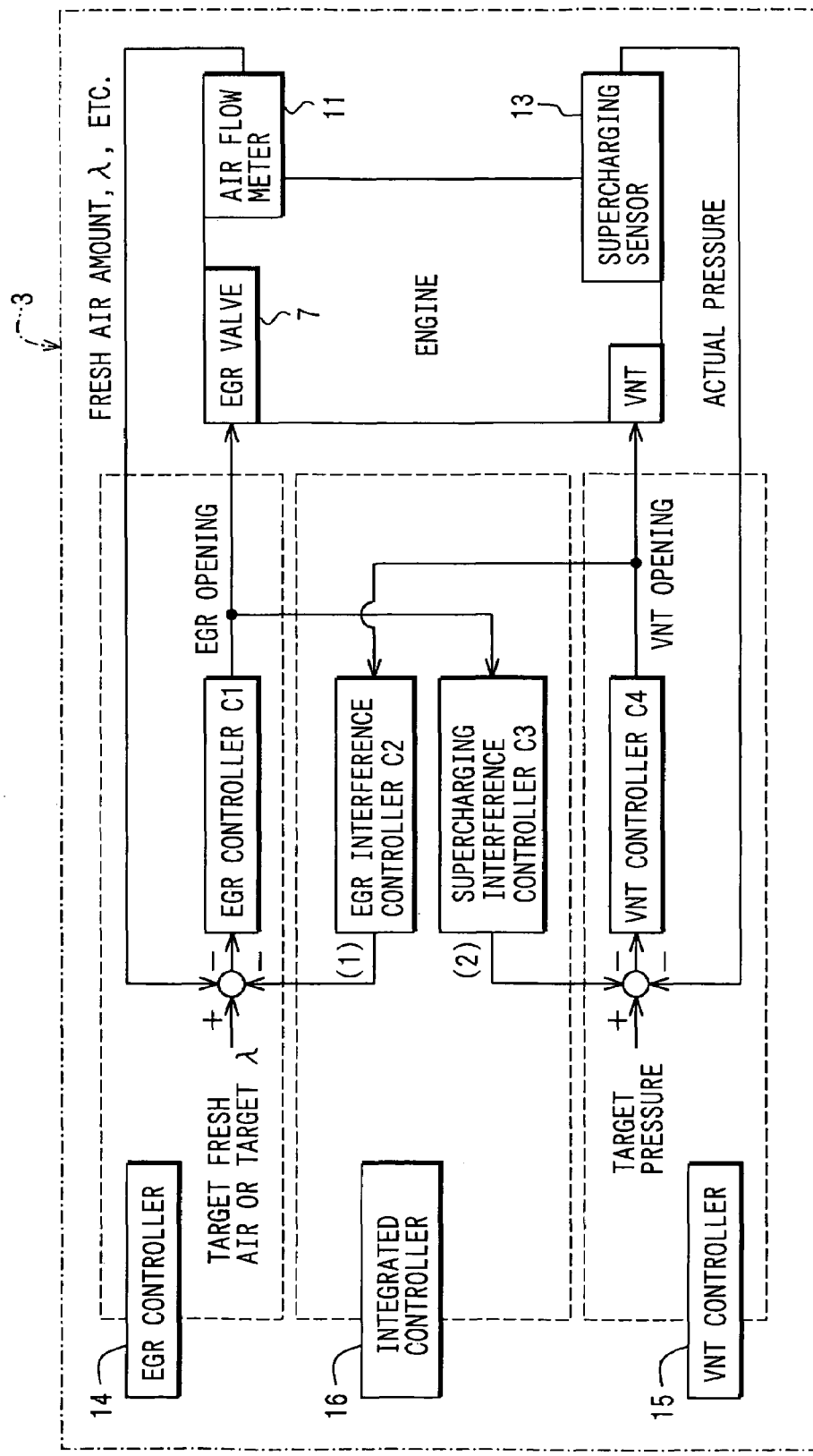
FIG. 1 is a block diagram including an ECU for controlling an EGR and supercharging pressure in accordance with the principles of the present invention.

FIG. 1 is a block diagram showing a control device for controlling EGR and supercharging pressure of a diesel engine.

Figure 2:
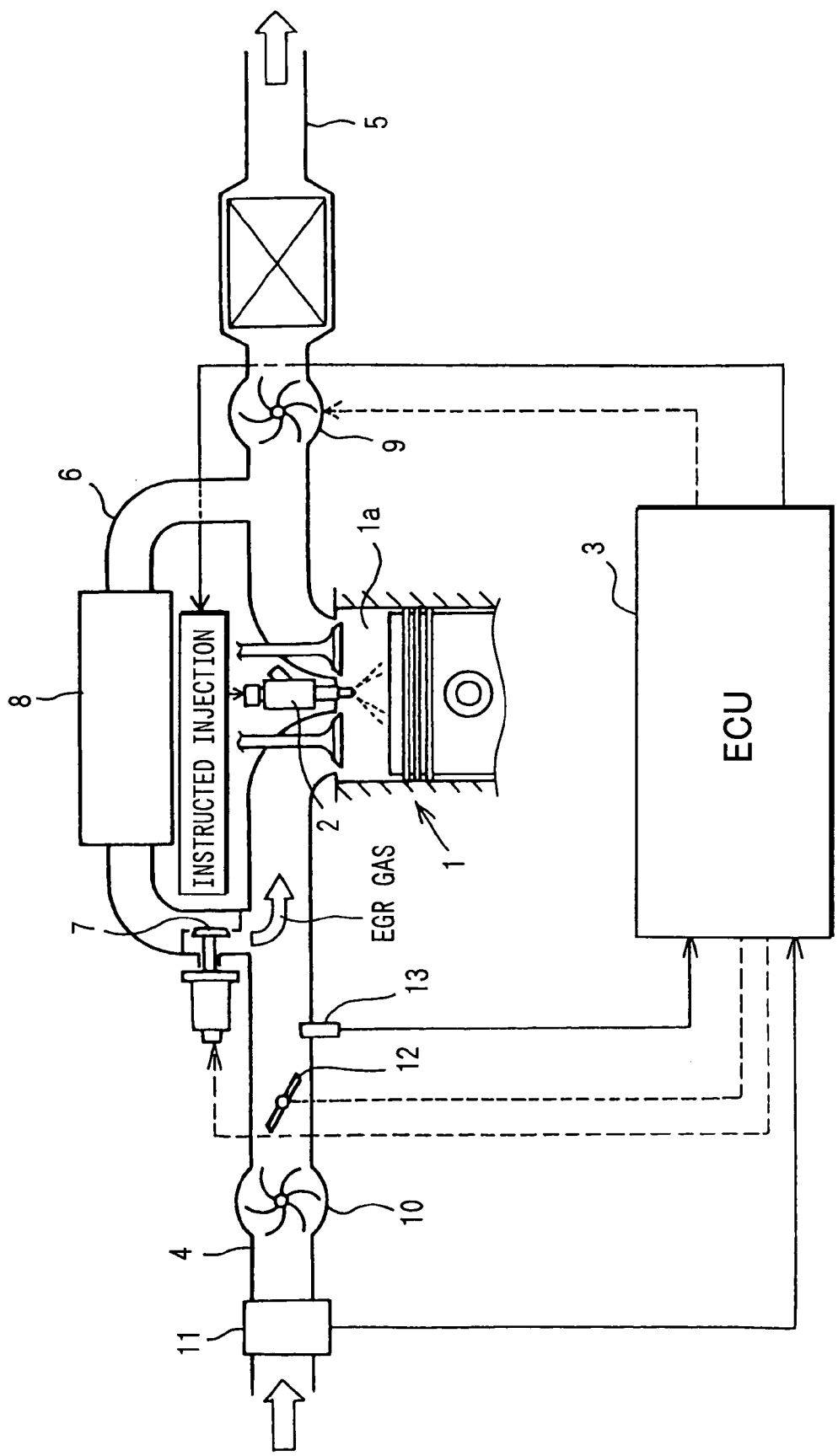
FIG. 2 is a schematic diagram of an air system of a diesel engine in accordance with the principles of the present invention.

In the diesel engine according to a first embodiment, an injector 2 is secured to a cylinder head of each cylinder engine 1 as shown in FIG. 2, and high-pressure fuel supplied from a common rail (not shown) is injected into a combustion chamber 1a in the cylinder by the injector 2. The injection timing and injection amount of the injector 2 are controlled on the basis of a rotational number and load (acceleration opening degree) of the diesel engine by an electric control unit (referred to as ECU 3).

The diesel engine is equipped with an EGR system for directing a part of the exhaust gas to an air intake passage 4, and a variable-capacity type turbo supercharger.

The EGR system has an EGR passage 6 through which an exhaust passage 5 and the air intake passage 4 intercommunicate with each other, and an EGR valve 7 equipped in the EGR passage 6, and it can adjust the amount of exhaust gas directed to the air intake passage 4 (exhaust reflow amount) in accordance with the opening degree of the EGR valve 7 (referred to as EGR opening degree). For example, a water cooling type cooling device 8 for cooling gas through heat-exchange with cooling water is equipped at some midpoint of the EGR passage 6.

The turbo supercharger comprises an exhaust turbine 9 equipped in the exhaust passage 5 downstream of the inlet port of the EGR passage 6, and a compressor 10 equipped in the air intake passage 4 upstream of the outlet port of the EGR passage 6. When the exhaust turbine 9 is rotated upon receiving exhaust gas energy discharged from the inside of the cylinder of the diesel engine, the compressor 10 linked coaxially with the exhaust turbine 9 is rotated to pressurize the intake air.

The turbo supercharger has an adjustable nozzle (not shown) at the entrance of a scroll of the exhaust turbine 9 and it can change the supercharging pressure in accordance with the opening degree of the adjustable nozzle (referred to as VNT opening degree).

The air intake passage 4 is equipped with an air flow meter 11 upstream of the compressor 10. The intake air amount (fresh air amount) measured by the air flow meter 11 is output as an analog signal to the ECU 3. A diesel throttle 12 controlled by the ECU 3 is located downstream of the compressor 10 and a supercharging pressure sensor 13 for detecting the pressure of intake air (supercharging pressure) and outputting the detection result to the ECU 3 is located downstream of the diesel throttle 12.

As shown in FIG. 1, the ECU 3 has an EGR controller 14 for driving the EGR valve 7, a VNT controller 15 for driving the adjustable nozzle to control supercharging pressure, and an integrated controller 16 for preventing interference between the EGR control and the supercharging pressure control.

The EGR controller 14 has an EGR controller C1 for controlling the EGR valve 7 with an optimal F/B gain based on the driving condition of the diesel engine (the engine rotational number, the injection amount, the fresh air amount, the VNT opening degree, etc.).

The VNT controller 15 has a VNT controller C4 for controlling the adjustable nozzle with the optimal F/B gain based on the driving condition of the diesel engine (the engine rotational number, the injection amount, the supercharging pressure, the EGR opening degree, etc.).

Figure 3:
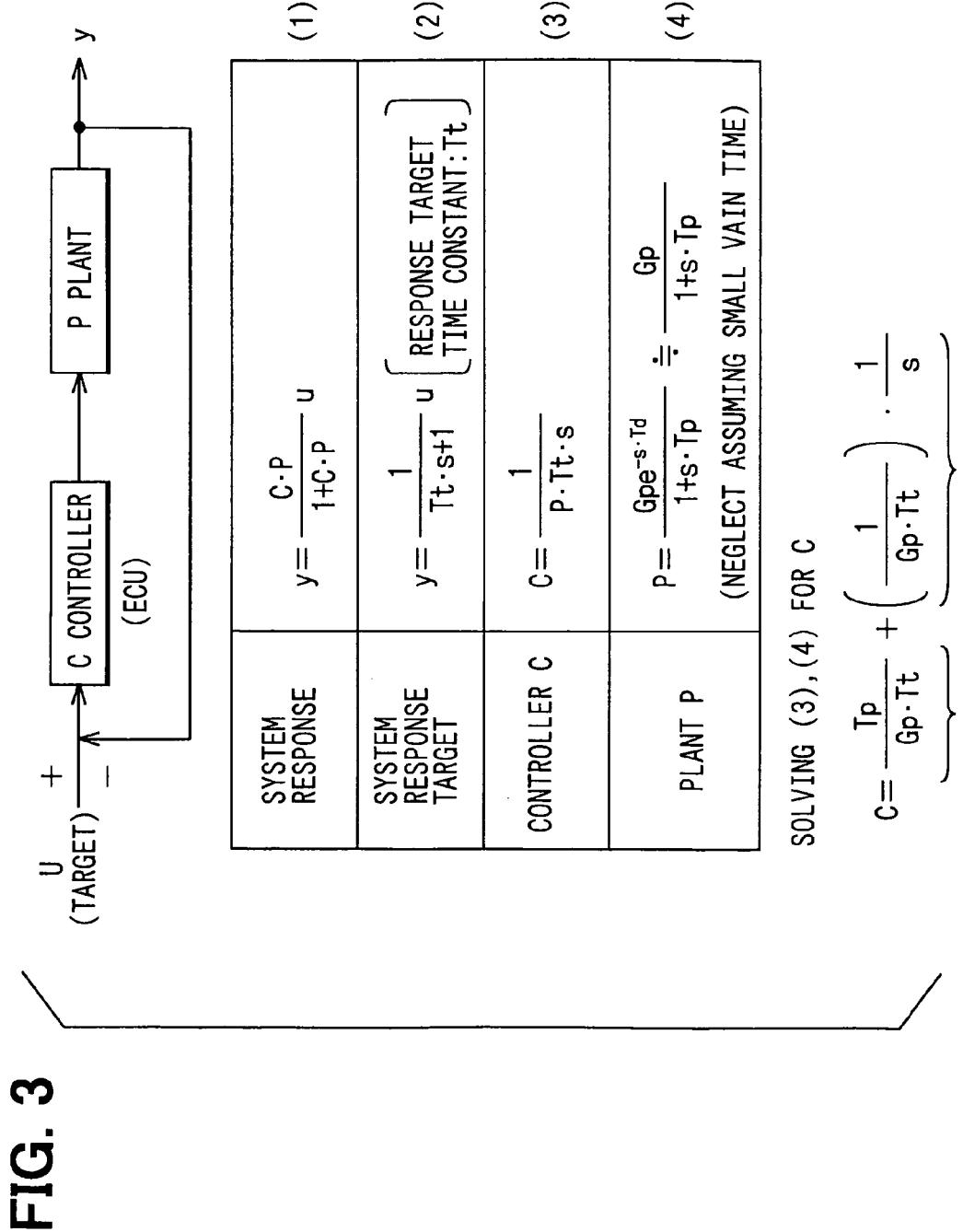
FIG. 3 is a diagram of a design manner of an EGR controller and a VNT controller in accordance with the principles of the present invention.

A general design of the EGR controller C1 and the VNT controller C4 is shown in FIG. 3.

The integrated controller 16 comprises an EGR interference amount controller C2 for calculating an effect of the opening degree variation of the adjustable nozzle on the EGR operation as an EGR correction amount and a supercharging pressure interference amount controller C3 for calculating an effect of the opening degree variation of the EGR valve 7 on the supercharging pressure as a supercharging pressure correction amount.

Figure 4:
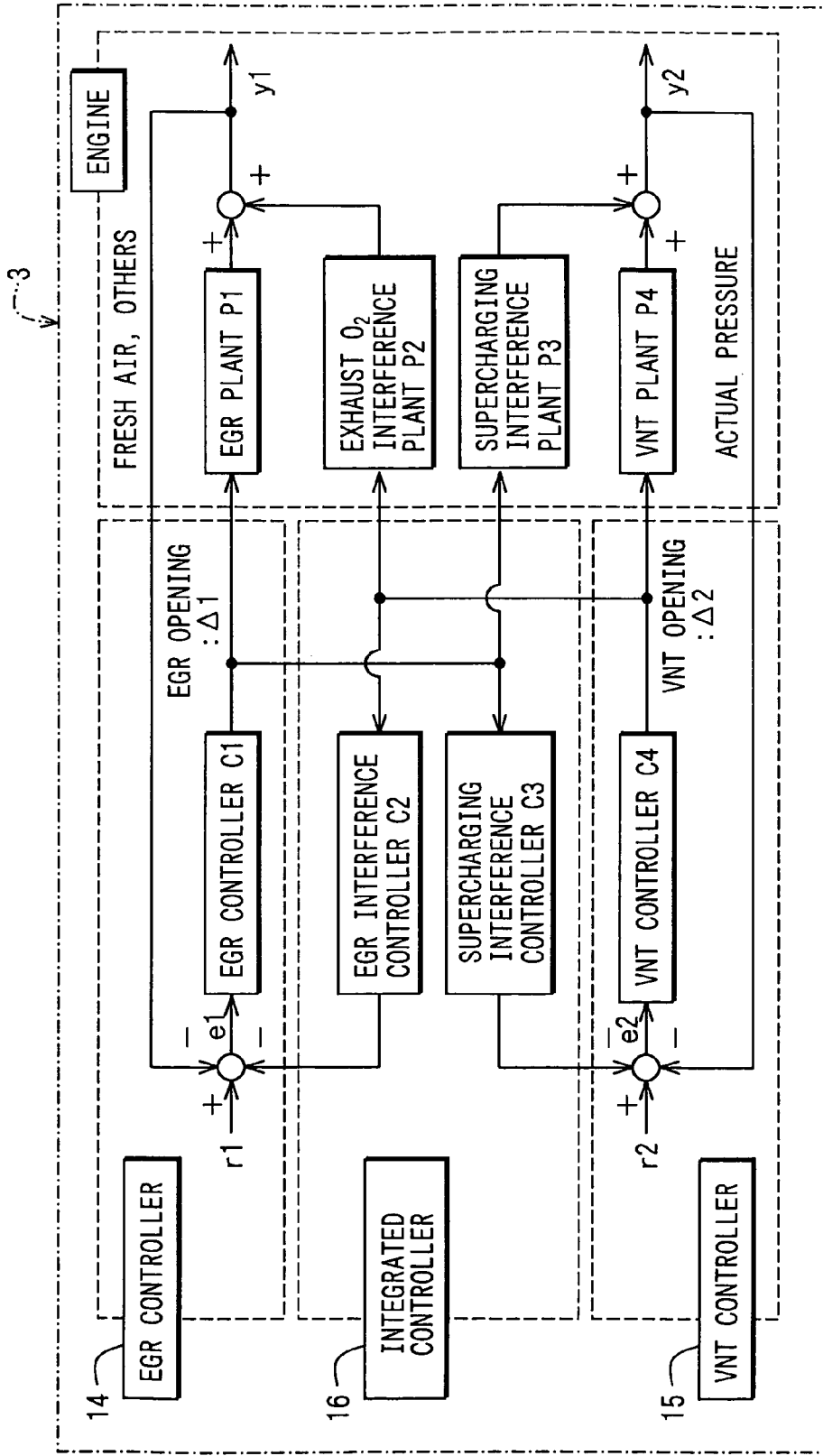
FIG. 4 is a block diagram of a design method of an interference amount controller in accordance with the principles of the present invention.
Figure 5A:
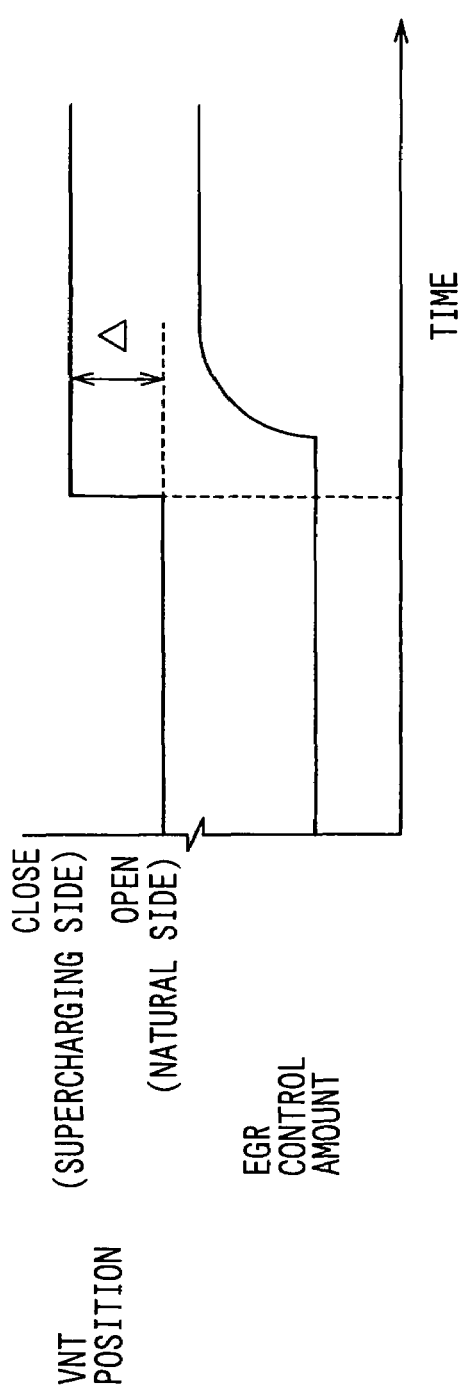
FIG. 5A is a graph of a time-variation of an EGR relative to a VNT position variation in accordance with the principles of the present invention.
Figure 5B:
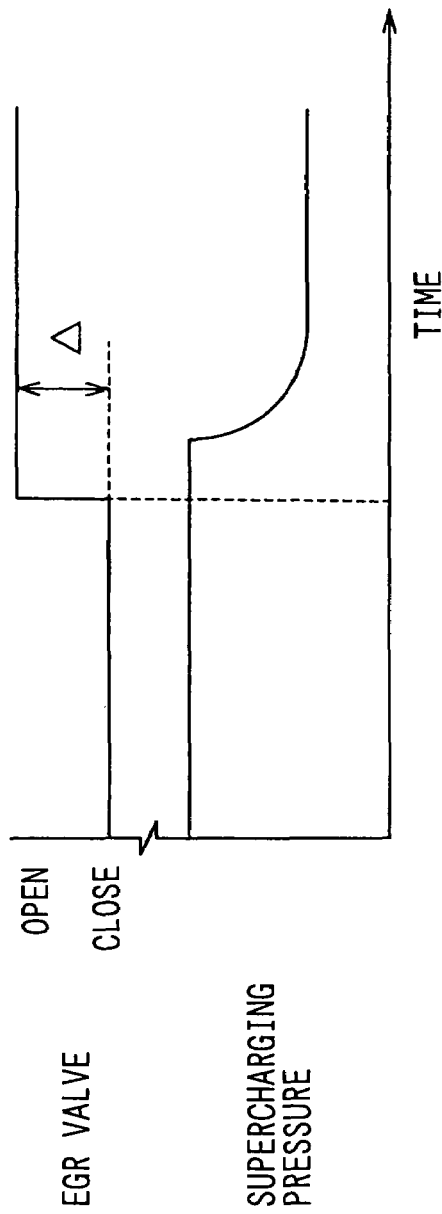
FIG. 5B is a graph of a time-variation of supercharging pressure relative to an EGR opening degree variation in accordance with the principles of the present invention.
Figure 6:
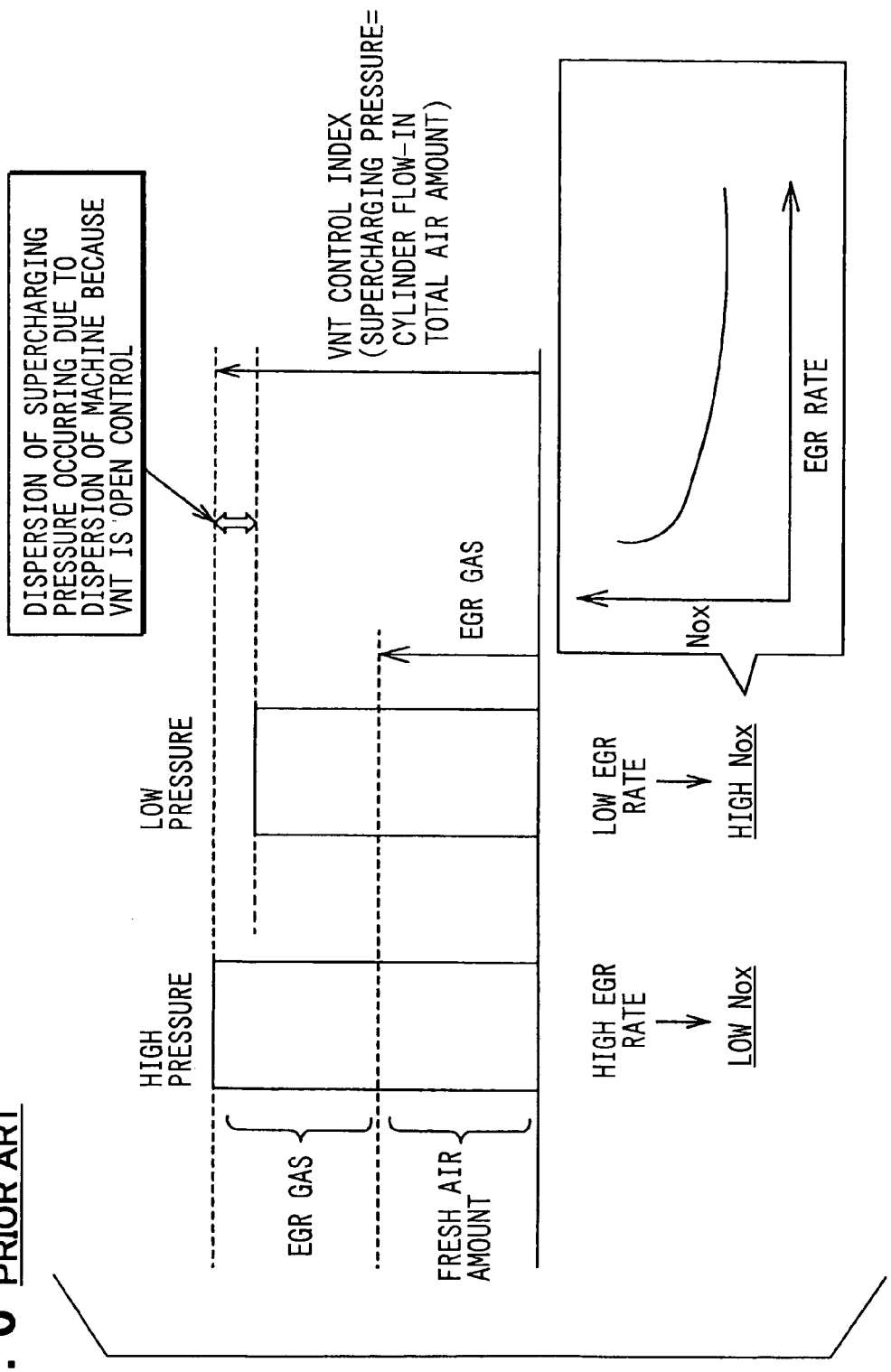
FIG. 6 is a pair of graphs illustrating problems of an open control of a conventional control of a turbo supercharger.

The EGR interference amount controller C2 and the supercharging pressure interference amount controller C3 can be illustrated by the diagram shown in FIG. 4 and represented by equations 1 and 2.

Equation 1:

$$y1 = P2 \cdot \Delta 2 + P1 \cdot C1 \cdot e1 \quad (1)$$

$$e1 = r1 - y1 - C2 \cdot \Delta 2 \quad (2)$$

here, it is desired that y1 is determined without being affected by $P2 \cdot C2$, that is, by the VNT positional variation.

$$y1 = [C1 \cdot P1/(1 + C1 \cdot P1)]r1 \quad (3)$$

From (1) and (3), $$[C1 \cdot P1/(1 + C1 \cdot P1)]r1 = P2 \cdot \Delta 2 + P1 \cdot C1 \cdot e1 \quad (4)$$

From (2) and (4), $$C2 = P2/C1 \cdot P1 \quad (5)$$

Likewise,

Equation 2:

$$C3 = P3/C4 \cdot P4$$

In (5), a plant is approximated by "primary delay+vain time" and it is expressed by Laplace space, $$P2 = [K2/(1 + sT2)]e^{-sL2}$$

Here, K2 represents the gain of the output to the input of the plant P2, T2 represents a response time constant, and L2 represents a response vain time.

Likewise, $$P1 = [K1/(1 + sT1)]e^{-sL1}$$

The EGR controller C1 is represented as follows:

$$C1 = [T1/K1 \cdot Tt] + [1/K1 \cdot Tt][1/s]$$

$$= (1 + sT1)/(sK1 \cdot Tt)$$

Accordingly, $$C2 = [sK2 \cdot Tt/(1 + sT2)]e^{-s(L2-L1)}$$

From the foregoing description, the controller (1) (the above C2) needed to properly control the EGR valve position while canceling the effect of the VNT opening degree variation is achieved.

Likewise, $$C3 = [sK3 \cdot Tt/(1 + sT3)]e^{-s(L3-L4)}$$

The calculation result of the EGR interference amount controller C2 corrects the fresh air amount measured by the air flow meter 11 and the correction result is sent to the EGR controller C1.

The EGR controller C1 subjects the EGR valve 7 to a feedback control operation in accordance with the deviation between the EGR control amount (the fresh air amount, the excess air ratio λ or the like) corrected by the output (calculation result) of the EGR interference amount controller C2 and the target EGR control amount.

The calculation result of the supercharging pressure interference amount controller C3 corrects the supercharging pressure detected by the supercharging pressure sensor 13 and the correction result is sent to the corrected supercharging pressure to the VNT controller C4.

The VNT controller C4 subjects the adjustable nozzle to the feedback control operation in accordance with the deviation between the supercharging pressure corrected by the output (calculation result) of the supercharging pressure interference amount controller C3 and the target supercharging pressure.

The outputs of the EGR interference amount controller C2 and the supercharging pressure interference amount controller C3 (the operation results) are used while limited to the stationary driving operation of the diesel engine.

For example, when the vehicle is accelerated, the EGR valve 7 is controlled to be fully closed and the adjustable nozzle of the turbo supercharger is controlled to the supercharging side (close side). Here, when the EGR valve 7 is subjected to the feedback control operation in anticipation of the variation of the EGR operation occurring in accordance with the opening degree variation of the adjustable nozzle, the EGR valve 7 is subjected to F/B control in anticipation of reduction of the fresh air amount occurring due to the valve closing operation of the adjustable nozzle so that the response of the EGR operation is delayed. Likewise, when the adjustable nozzle is subjected to the feedback in anticipation of the variation of the supercharging pressure occurring in accordance with the opening degree variation of the EGR valve 7, the adjustable variation nozzle is subjected to the F/B control in anticipation of increase of the supercharging pressure occurring due to the valve closing operation of the EGR valve 7 so that the response of the supercharging pressure is delayed.

Accordingly, during the transit period of the diesel engine, the response of EGR and supercharging pressure would be more excellent when the outputs (calculation results) of the EGR interference amount controller C2 and the supercharging pressure interference amount controller C3 are not used rather than when they are used. Therefore, the outputs of the EGR interference amount controller C2 and the supercharging pressure interference amount controller C3 are used only when the driving state of the diesel engine is stationary.

As a method of identifying the stationary state, the state is identified as a stationary state if the supercharging pressure which is lower in response speed than EGR is within the range of the target supercharging pressure ±α, and the state is identified as a transit state if the supercharging pressure is out of the range (α is set to 5 kPa, for example).

According to the first embodiment, the operation amount of the EGR valve is calculated by using the output of the EGR interference amount controller C2, whereby the EGR opening degree can be controlled in anticipation of the effect of the opening degree variation of the adjustable nozzle on the EGR operation. Likewise, the operation amount of the adjustable nozzle is calculated by using the output of the supercharging pressure interference amount controller C3, whereby the VNT opening degree can be controlled in anticipation of the effect of the opening degree of the EGR valve 7 on the supercharging pressure. As a result, the mutual interference between the EGR control and the supercharging pressure control can be avoided, and each of the EGR controller C1 and the VNT controller C4 can be adapted with the optimal F/B gain, so that EGR (for example, the fresh air amount) and the supercharging pressure can be controlled as expected.

In the first embodiment, the plant P2 and the plant P3 shown in FIG. 4 are approximately expressed by "vain time+primary delay", and thus the variation of EGR occurring in accordance with the opening degree variation of the adjustable nozzle and the variation of the supercharging pressure occurring in accordance with the opening degree variation of the EGR valve 7 can be simply estimated without using any complicated physical model.

Furthermore, in the first embodiment, the mutual interference between the EGR control and the supercharging pressure control can be avoided without setting feedback prohibiting areas in the EGR control area and the supercharging pressure control area. Therefore, the feedback adaptation can be performed so that the operation performance of the actuator for driving the EGR valve 7 and the operation performance of the actuator for driving the adjustable nozzle can be conducted at maximum level. As a result, aggravation of smoke and dispersion of $NO_x$ can be prevented, and the engine output (for example, acceleration performance) can be sufficiently conducted.

In the first embodiment, both the EGR controller C1 and the VNT controller C4 have no open term in the PI control. However, when they have D terms, the interference amount controllers C2, C3 can be derived in the same manner as described above by adding the D terms.

In the first embodiment, even when the open terms are provided, the calculation results of the interference amount controllers C2, C3 can be reflected only when the difference between the supercharging pressure and the target supercharging pressure is conducted to some degree. Under such a situation, the variation of the EGR valve 7 and VNT position by the open term is conducted. Therefore, even when the interference amount controllers C2, C3 are designed on the basis of P-term and I-term with paying no attention to the open term, the interference between EGR (for example, the fresh air amount) and the supercharging pressure can be suppressed as expected.

The invention claimed is:

1. An engine control device for controlling an exhaust gas recirculation operation, comprising:
    a variable-capacity turbo supercharger having an adjustable nozzle for varying an entrance area of an exhaust turbine and operable to change a supercharging pressure in accordance with the opening degree of the adjustable nozzle;
    an EGR valve for adjusting an exhaust reflow amount of exhaust gas flowing from an exhaust passage to an air intake passage;
    a supercharging pressure controller for driving the adjustable nozzle to control the supercharging pressure;
    an EGR controller for driving the EGR valve to control the exhaust gas recirculation operation; and
    an EGR correction amount calculator for calculating an EGR correction amount that defines an effect of the opening degree variation of the adjustable nozzle on the exhaust gas recirculation operation, wherein the EGR controller performs a feedback control operation on the EGR valve in accordance with a deviation between an EGR control amount corrected by the EGR correction amount and a target EGR control amount.

2. The engine control device of claim 1, wherein controlling the exhaust gas recirculation operation includes controlling at least one of the exhaust reflow amount, a fresh air amount, an excess air ratio, an intake $O_2$ concentration, an exhaust $O_2$ concentration, and an EGR rate.

3. The diesel engine control device of claim 1, wherein when a relational expression between the deviation input to the EGR controller and the operation amount of the EGR valve is set to C1, a relational expression between the variation of the opening degree of the adjustable nozzle input to the EGR correction amount calculator and the EGR correction amount calculated is set to C2, an equation representing the variation amount of EGR occurring due to variation of the opening degree of the EGR valve is set to P1 and an equation representing the variation amount of EGR occurring due to variation of the opening degree of the adjustable nozzle is set to P2, $$C2=P2/(C1 \cdot P1) \qquad (1)$$

the EGR correction amount calculator calculates the EGR correction amount C2 from the above equation (1).

4. The diesel engine control device of claim 1, wherein the EGR correction amount calculator stores the time-variation of EGR occurring in accordance with the opening degree variation of the adjustable nozzle as an approximate expression represented by a vain time and a primary delay, and the variation amount of EGR occurring in accordance with the opening degree variation of the adjustable nozzle is calculated from the approximate expression.

5. The diesel engine control device of claim 1, wherein the EGR controller subjects the opening degree of the EGR valve to feedback control operation in anticipation of an effect of the opening degree variation of the adjustable nozzle on EGR only when it is judged that the driving state of the diesel engine is stationary.

6. An engine control device for controlling an exhaust gas recirculation operation, comprising:

a variable-capacity turbo supercharger having an adjustable nozzle for varying an entrance area of an exhaust turbine and operable to change a supercharging pressure in accordance with the opening degree of the adjustable nozzle;

an EGR valve for adjusting an exhaust reflow amount of exhaust gas redirected from an exhaust passage to an air intake passage;

a supercharging pressure controller for driving the adjustable nozzle to control the supercharging pressure;

an EGR controller for driving the EGR valve to control the exhaust gas recirculation operation; and a supercharging pressure correction amount calculator for calculating an supercharging pressure correction amount defined as an effect of the opening degree variation of the EGR valve on the supercharging pressure, wherein the supercharging pressure controller performs a feedback control operation on the adjustable nozzle in accordance with a deviation between the supercharging pressure corrected by the supercharging pressure correction amount and a target supercharging pressure.

7. The engine control device of claim 6, wherein controlling the exhaust gas recirculation operation includes controlling at least one of the exhaust reflow amount, a fresh air amount, an excess air ratio, an intake $O_2$ concentration, an exhaust $O_2$ concentration, and an EGR rate.

8. The diesel engine control device of claim 6, wherein when a relational expression between the variation of the opening degree of the EGR valve input to the supercharging pressure correction amount calculator and the supercharging pressure correction amount calculated is set to C3, a relational expression between the deviation input to the supercharging pressure controller and the operation amount of the adjustable nozzle is set to C4, an equation representing the variation amount of the supercharging pressure occurring in accordance with the opening degree variation of the EGR valve is set to P3, and an equation representing the variation amount of the supercharging pressure occurring due to the opening degree variation of the adjustable nozzle is set to P4, $$C3=P3/(C4 \cdot P4) \qquad (2)$$

the supercharging pressure correction amount calculator calculates the 5 supercharging pressure correction amount C3 from the equation (2).

9. The diesel engine control device of claim 6, wherein the supercharging pressure correction amount calculator stores the time-variation of the supercharging pressure occurring in accordance with the opening degree variation of the EGR valve as an approximate expression represented by a vain time and a primary delay, and calculates the variation amount of the supercharging pressure occurring in accordance with the opening degree variation of the EGR valve according to the approximate expression.

10. The diesel engine control device of claim 6, wherein the supercharging pressure controller subjects the opening degree of the adjustable nozzle to the feedback control operation in anticipation of the effect of the opening degree variation of the EGR valve on the supercharging pressure only when it is judged that the driving state of the diesel engine is stationary.

11. An engine control device for controlling an exhaust gas recirculation operation, comprising:

a variable-capacity turbo supercharger having an adjustable nozzle for varying an entrance area of an exhaust turbine and operable to change a supercharging pressure characteristic in accordance with the opening degree of the adjustable nozzle;

an EGR valve for adjusting an exhaust reflow amount of exhaust gas redirected from an exhaust passage to an air intake passage;

a supercharging pressure controller for driving the adjustable nozzle to control the supercharging pressure;

an EGR controller for driving the EGR valve to control the exhaust gas recirculation operation; and an EGR correction amount calculator for calculating an EGR correction amount defined as an effect of the opening degree variation of the adjustable nozzle on the exhaust gas recirculation operation;

a supercharging pressure correction amount calculator for calculating a supercharging pressure correction amount defined as an effect of the opening degree variation of the EGR valve on the supercharging pressure, wherein the EGR controller performs a feedback control operation on the EGR valve in accordance with a deviation between an EGR control amount corrected by the EGR correction amount and a target EGR control amount, and the supercharging pressure controller performs a feedback control operation on the adjustable nozzle in accordance with the deviation between the supercharging pressure corrected by the supercharging pressure correction amount and a target supercharging pressure.

12. The engine control device of claim 11, wherein controlling the exhaust gas recirculation operation includes controlling at least one of the exhaust reflow amount, a fresh air amount, an excess air ratio, an intake $O_2$ concentration, an exhaust $O_2$ concentration, and an EGR rate.

* * * * *